(12) United States Patent
Haller

(10) Patent No.: US 9,111,276 B2
(45) Date of Patent: Aug. 18, 2015

(54) SECURE EXECUTION ENVIRONMENTS FOR PROCESS MODELS

(75) Inventor: Jochen Haller, Karlsruhe (DE)

(73) Assignee: SAP SE, Walldorf, DE (US)

( * ) Notice: Subject to any disclaimer, the term of this patent is extended or adjusted under 35 U.S.C. 154(b) by 2654 days.

(21) Appl. No.: 11/636,667

(22) Filed: Dec. 8, 2006

(65) Prior Publication Data
US 2008/0141336 A1 Jun. 12, 2008

(51) Int. Cl.
| | | |
|---|---|---|
| G06Q 20/00 | (2012.01) | |
| G06Q 20/38 | (2012.01) | |
| G06F 21/62 | (2013.01) | |

(52) U.S. Cl.
CPC .............. *G06Q 20/382* (2013.01); *G06F 21/62* (2013.01)

(58) Field of Classification Search
USPC .......................................................... 705/64
See application file for complete search history.

(56) References Cited

U.S. PATENT DOCUMENTS

| | | | |
|---|---|---|---|
| 7,047,463 B1* | 5/2006 | Organ et al. ................... | 714/724 |
| 2005/0086297 A1 | 4/2005 | Hinks | |
| 2005/0283824 A1* | 12/2005 | Nakamura et al. ................. | 726/1 |
| 2006/0136555 A1* | 6/2006 | Patrick et al. .................. | 709/203 |
| 2006/0143686 A1 | 6/2006 | Maes | |
| 2006/0161272 A1* | 7/2006 | Haller et al. ..................... | 700/29 |
| 2008/0256364 A1* | 10/2008 | Chang et al. ................... | 713/189 |

OTHER PUBLICATIONS

IEEE 100 The Authoritative Dictionary of IEEE Standards Terms, Seventh Edition.*

Extended EP Search Report for EP Patent Application No. 07021189.1, mailed Feb. 11, 2008, 8 pages.
Active BPEL, "ActiveBPEL Engine Architecture", www.activebpel.org/docs/architecture.html, (Printed from the Internet on Dec. 6, 2006), 9 pages.
"How to Implement a Provider for the Java Cryptography Extension 1.2.2", http://java.sun.com/products/jce/doc/guide/HowToImplAProvider.html, Sun Microsystems, Inc., (May 3, 2002), 61 pages.
Sun Developer Network, "Java Authentication and Authorization Service (JAAS)in Java 2, Standard Edition (J2SE) 1.4", http://java.sun.com/developer/technicalArticles/Security/jaasv2/index.html, Sun Microsystems, Inc., (Sep. 2, 2003), 9 pages.
Comodo, "Security Authentication Two Factor Authentication FFIEC Compliance Multifactor Authentication Enterprise Authentication", http://www.comodogroup.com/banking/takeatour.html, Comodo Group, (Printed from the Internet on Dec. 6, 2006), 3 pages.
Oasis, "Web Services Business Process Execution Language Version 2.0", wsbpel-specification-draft-01, http://docs.oasis-open.org/wsbpel/2.0/, (Aug. 23, 2006), 276 pages.

(Continued)

*Primary Examiner* — Zeshan Qayyum
(74) *Attorney, Agent, or Firm* — Brake Hughes Bellermann LLP

(57) ABSTRACT

An application server may provide an execution environment and a process execution engine that executes a process model within the execution environment. The process execution engine may include an operational component configured to perform an operation that is associated with the execution of the process model and based on a security policy, as well as a security provider configured to determine, based on the operation and on the security policy, at least one security service from among a plurality of security services executing within the process execution engine, and configured to provide the operational component with the at least one security service for use in securing the operation.

9 Claims, 5 Drawing Sheets

(56) References Cited

OTHER PUBLICATIONS

Biermann, Elmarie, "A Framework for the Protection of Mobile Agents Against Mailcious Hosts", (Sep. 2004), 238 pages.

Damianou, Nicodemos, et al., "Ponder: A Language for Specifying Security and Management Policies for Distributed Systems", The Language Specification, Version 2.3, Imperial College Research Report DoC 2000/1, (Oct. 20, 2000), 49 pages.

Gelbart, Olga, et al., "SPEE: A Secure Program Execution Environment Tool Using Static and Dynamic Code Verification", (Dec. 22, 2004), 7 pages.

Hauswirth, Manfred, "Dissertation: Internet-Scale Push Systems for Information Distribution—Architecture, Components, and Communication", (Aug. 1999), 167 pages.

Hollingsworth, David, "Workflow Management Coalition, The Workflow Reference Model", The Workflow Management Coalition Specification, (Jan. 19, 1995), 55 pages.

Leune, Kees, "EFSOC Framework Overview and Infrastructure Services", Infolab Technical Report Series, INFOLAB-TR-13, (Aug. 23, 2003), 46 pages.

McLean, John, "A Comment on the "Basic Security Theorem" of Bell and LaPadula", Information Processing Letters, vol. 20, (1985), 67-70.

Schaad, Andreas, et al., "A case study of separation of duty properties in the context of the Austrian 'eLaw' process", ACM Symposium on Applied Computing, (Mar. 13-17, 2005), 1328-1332.

Tai, Stefan, et al., "Composition of Coordinated Web Services", ACM/IFIP/USENIX 5th International Middleware Conference, (Oct. 2004), 19 pages.

Thomas, R. K., et al., "Task-based Authorization Controls (TBAC): A Family of Models for Active and Enterprise-oriented Authorization Management", Proceedings of the IFIP WG11.3 Workshop on Database Security, (Aug. 11-13, 1997), 16 pages.

Zhang, Min, et al., "Adding Security Features to FIPA Agent Platforms", (2001), 16 pages.

* cited by examiner

SECURE EXECUTION ENVIRONMENTS FOR PROCESS MODELS

TECHNICAL FIELD

This description relates to secure process execution environments.

BACKGROUND

Modeling languages may be used as meta-languages to describe and execute underlying processes, such as business processes. For example, process modeling languages allow an enterprise to describe tasks of a process, and to automate performance of those tasks in a desired order to achieve a desired result. For instance, the enterprise may implement a number of business software applications, and process modeling may allow coordination of functionalities of these applications, including communications (e.g., messages) between the applications, to achieve a desired result. Further, such process modeling generally relies on a language that is common to, and/or interoperable with, many types of software applications and/or development platforms. As a result, for example, process modeling may be used to provide integration of business applications both within and across enterprise organizations.

Such modeling languages allow a flow of activities to be graphically captured and executed, thereby enabling resources responsible for the activities to be coordinated efficiently and effectively. The flow of work in a process may be captured through routing (e.g., control flow) constructs, which allow the tasks in the process to be arranged into the required execution order through, for example, sequencing, choices (e.g., decision points allowing alternative branches), parallelism (e.g., tasks running in different branches which execute concurrently), iteration (e.g., looping in branches) and synchronization (e.g., the coming together of different branches).

Within the framework or infrastructure provided by such modeling languages and process execution environments, many different applications may be implemented. For example, business applications, such as customer relationship management, supply chain management, or inventory control applications may be implemented, at least in part, by using such process automation.

In many such applications, confidential data may need to be stored, exchanged, or accessed. Consequently, it may be advantageous or required to have a sufficient amount of security that may be provided in association with such data. For example, some conventional approaches have implemented security mechanisms that are external to the processes and their execution environment(s) themselves, and that enforce security requirements in a non-intrusive manner, e.g., by intercepting inputs to, or outputs of, the processes. Such approaches, however, may be limited in their ability to provide a range or extent of in depth security mechanisms.

SUMMARY

According to one general aspect, a system includes an application server configured to provide an execution environment, and a process execution engine configured to execute a process model within the execution environment. The process execution engine may include an operational component configured to perform an operation that is associated with the execution of the process model and based on a security policy, and a security provider configured to determine, based on the operation and on the security policy, at least one security service from among a plurality of security services executing within the process execution engine, and configured to provide the operational component with the at least one security service for use in securing the operation.

According to another general aspect, an operation of an operational component executing within a process execution engine may be initiated, the operation associated with a security policy. The operation may be detected at a security provider executing within the process execution engine. At least one security service may be determined from among a plurality of security services executing within the process execution engine, at the security provider and based on the security policy. The at least one security service may be provided to the operational component for securing the operation.

According to another general aspect, a process execution engine may include a plurality of security services executing within the process execution engine, and an operational component configured to perform an operation associated with a process model executing within the process execution engine, the operation being associated with a security policy. A policy enforcement point may be associated with the operational component and configured to extract security-related attributes associated with the operation. A policy decision point may be configured to receive the security-related attributes for comparison to the security policy, and a security provider may be configured to receive a decision of the policy decision point and determine at least one security service of the plurality of security services, and may be further configured to provide the operational component with access to the at least one security service.

The details of one or more implementations are set forth in the accompanying drawings and the description below. Other features will be apparent from the description and drawings, and from the claims.

DETAILED DESCRIPTION

Figure 1:
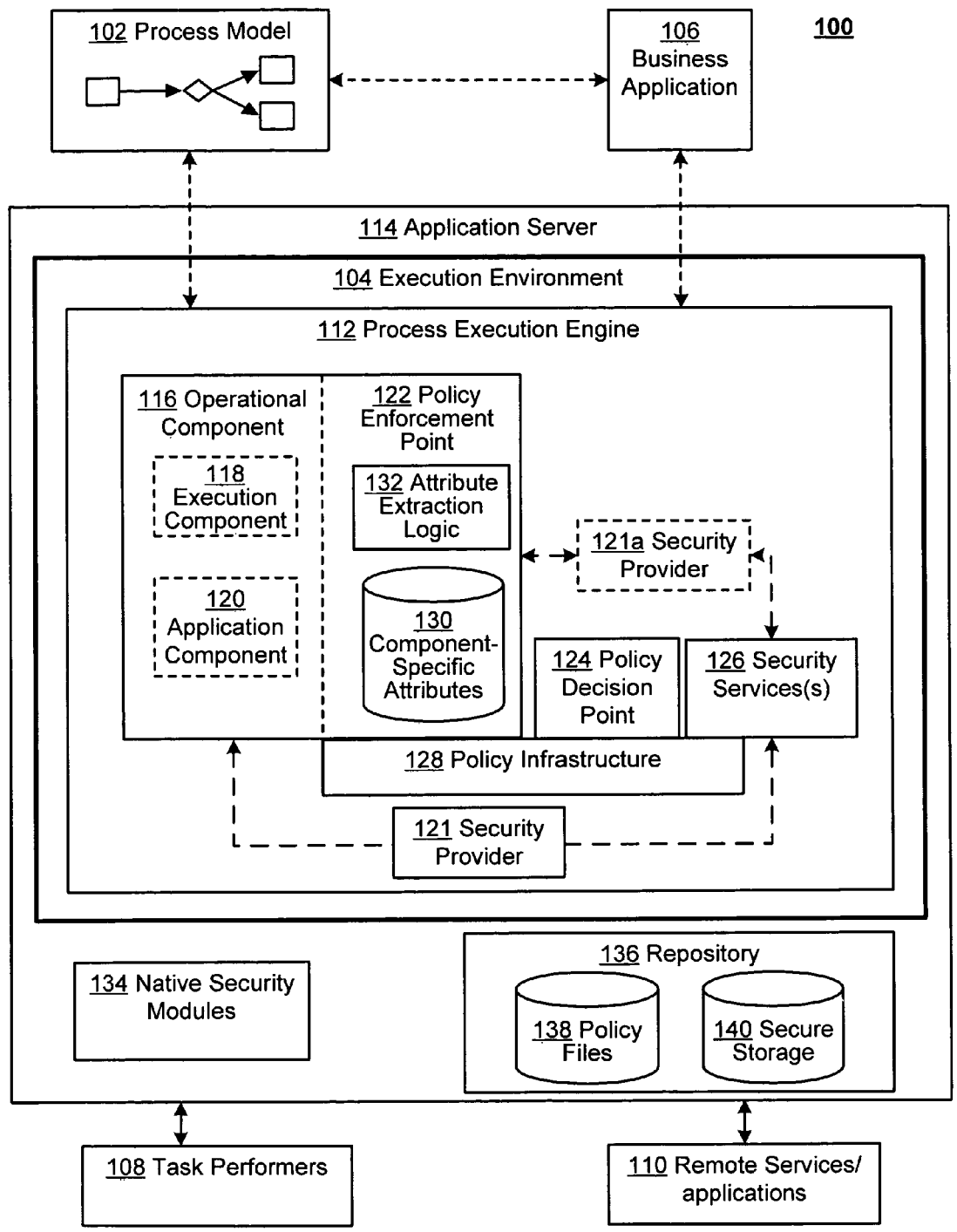
FIG. 1 is a block diagram of a system for providing secure execution environments for process models.

FIG. 1 is a block diagram of a system 100 for providing secure execution environments for process models. In the example of FIG. 1, the system 100 is configured to provide a number of different security mechanisms for a process model 102 implemented within an execution environment 104. For example, the system 100 may provide for a selection between, and use of, such security mechanisms, in a manner that is specific to application-layer components associated with the process model 102 when executing in the execution environment 104. Accordingly, the execution environment 104 may be constructed and implemented in a highly specialized, flexible, and secure manner.

In FIG. 1, and as referenced above, the process model 102 generally represents a plurality of nodes or tasks that are joined and ordered to obtain a desired result. That is, as illustrated by the example process model 102 illustrated in FIG. 1 (which is intended merely as a conceptualization or illustration of a process model, and not intended necessarily to represent a particular process model being executed in FIG. 1), nodes/tasks may be joined by appropriate edges (arrows) and control tasks (e.g., splits and/or joins) to obtain structures including parallel tasks, iterative tasks, nested loops, or other known task progressions.

The process model 102 may thus be used to obtain an outcome associated with, for example, a business application(s) 106. For example, the business application 106 may be built and implemented by an enterprise or other entity to perform some business functionality, such as, for example, a manufacture (or other supply) of goods for sale, or a distribution or other shipment process for the goods for sale. Generally, the term business application should be interpreted broadly as including any application that is used in profit generation of some sort, although the business application 106 also may refer to non-profit endeavors as well, including military or other governmental entities, and also including schools, churches, charities, hospitals, or virtually any other organization. Further, the business application 106 is merely provided as an example, and other applications, such as applications for personal use, also may be used.

The tasks of the process model 102 may be implemented by humans and/or computers. For example, in FIG. 1, task performers 108 may represent human users who receive a message(s) during execution of the process model 102 to perform a certain task, and report back a result of the task.

Meanwhile, remote services/applications 110 may refer generally to one or more application(s) having one or more specific functionalities that are exposed to other applications, often over a network (e.g., the Internet) by way of a service interface (where an operation and use of the interface may be known or determined, as needed). When such a service (and/or an interface of the service) is exposed/available over the World Wide Web (referred to herein as the WWW or the web), then the service may be known as a web service. For example, the remote services/applications 110 may provide virtually any functionality that may be provided by an application over a network, including, for instance, providing stock quotes, providing airline or other reservations, providing purchasing/invoicing functionalities, or providing some aspect of supply chain management or inventory control.

Using such services and service interactions to implement the process model 102 may be referred to as a service-oriented architecture (SOA), in which, as just described, process tasks result in execution of the services. Further, processes that rely on services to realize process tasks may themselves be deployed and accessed as services, which may be referred to as process-based service composition. Languages exist, such as, for example, the Business Process Execution Language (BPEL), that are designed to provide such compositions of services (e.g., web services), and thus provide a top-down, process-oriented approach to the SOA. Accordingly, BPEL or other such languages (such as, for example, the Web Services Flow Language (WSFL), the extensible language (XLANG), and/or the Business Process Modeling Language (BPML)), or modifications/extensions thereof, may be used to define and implement the process model 102.

Depending, for example, on the business application 106, different security requirements may be associated with the process model 102. For example, the business application 106 may include a banking or other financial application, or may include a military application, or other application with a high level of specific security needs. For example, there may be a need to authorize and/or authenticate the task performers 108 and/or the remote services/applications 110, or there may be a need to encrypt confidential data associated with the business application 106 and/or the process model 102. As described herein, the system 100 provides for such security in a manner that may be specific and specialized with respect to the business application 106 and/or to the process model 102, and in a manner that occurs at least partially within the execution environment 104, and/or within process execution engine 112.

The execution environment 104 may generally refer to software associated with an operation of computer program(s), such as the process execution engine 112 (described in more detail below), from a beginning to an end thereof. The execution environment 104 may provide functionality, services, or information to programs running thereon, that may be used to manage or otherwise execute the programs. For example, the execution environment 104 may include a "container," e.g., a web container and/or an Enterprise JavaBeans (EJB) container, that provides applications/services to programs (e.g., the process execution engine 112) running thereon. For example, the execution environment 104 may provide some basic element(s) of security, transaction processing, lifecycle management, deployment processing, or other known services or abilities, some of which are discussed in more detail, below.

The process execution engine 112 (which also may be referred to as a workflow engine, workflow enactment engine, orchestration engine, or other appropriate terminology) may be configured, among other functions, to execute an instance of the process model 102. For example, the process execution engine 112 may be in charge of ensuring that a given task of the process model 102 has actually been executed and completed, before allowing the given instance of the process model 102 to proceed to a following task. Thus, as referenced above, the process execution engine 112 may be understood to execute BPEL and/or other languages referenced herein, which themselves are designed to bridge the gap between business persons and computer specialists by providing techniques to graphically model, and then interpret/execute, business processes (also referred to as workflows).

The process execution engine 112, for example, may represent, or be used in conjunction with, known architectures of, for example, the Workflow Management Coalition (e.g., the Workflow Management Coalition workflow model and/or component model). Such architectures/models may include, for example, a process definition of the process model 102 (e.g., written in BPEL and executable on known process execution engines, such as ActiveBPEL) that may be modeled with a known graphical tool. That is, such a graphical tool may be used to establish a graphical notation of the process model 102 (e.g., using a language such as the Business Process Modeling Notation, or BPMN), which may then be mapped or bound to executable business process languages, such as BPEL.

Other elements, components, or entities associated with the system 100 may include a supervisor to administer the process execution engine 112 and monitor the ongoing process as it executes, as well as various interfaces between these and other components. Also, control flow data and/or logic may be included or associated with the process execution engine 112, and which may be used, for example, to manage and ensure the various control flow constructs referenced herein (e.g., splits, joins, loops, synchronizations, merges, and other control flow structures).

In addition, although the present description is primarily provided in conjunction with the execution of a single instance of a single process model, it will be understood and appreciated that multiple (instances of) process models may be executed, perhaps in conjunction with one another. Moreover, such process models may be implemented in the context of multiple process execution engines 112, perhaps operated by a plurality of (collaborating) enterprises or other organizations/entities. In such cases, there may be a global process model that coordinates operations of the collaborating process models.

In FIG. 1, the execution environment 104, and thus the process execution engine 112, is illustrated as executing within an application server 114. The application server 114 generally represents hardware and/or software that provides a platform for developing and deploying applications, such as enterprise applications. The application server 114 provides appropriate code and services to clients, including, for example, to client software of the task performers 108 and the remote services/applications 110. In conjunction with the execution environment 104, the application server 114 may provide certain standardized functions, abilities, or logic (e.g., business logic) that may then be used by an appropriate application, such as, in the example of FIG. 1, the process execution engine 112.

For example, in one example implementation the application server 114 may include a Java application server, such as a Java Platform Enterprise Edition (j2ee). In this case, the application server 114 may be associated with a Java Virtual Machine (JVM) that provides an engine for executing Java program(s) by interpreting Java bytecode. Further, the application server 114 may operate according to a specification (and associated application program interfaces (APIs)) for implementing Enterprise Java Beans (EJBs) that represent modular components for encapsulating business logic. In this example implementation(s), the EJB specification may be used by the application server 114 to provide certain low-level functionality including data persistence, transaction processing, messaging, security, and remote calls to other applications. That is, such low-level functionality refers generally to functionality that may be used in the design of essentially any application that may be run in the execution environment 104, including the process execution engine 112. For example, as described in more detail below, EJBs running on the application server 114 may provide authentication services/modules that may be used to design applications, such as the Java Authentication and Authorization Service (JAAS), which allows a number of different associated applications to access and use pre-defined authentication/authorization services.

Continuing the above example, the execution environment 104 may include or represent an EJB container and/or web container, into which EJBs are deployed for execution. Such containers may be used, for example, to perform the functions described above in association with the execution environment 104, and specifically, for example, to create instances of associated Java classes and interfaces for EJBs that are required to implement the instance of the process model 102 within the process execution engine 112.

Thus, the application server 114 provides a number of abilities, functions, modules, and services, and the execution environment 104 utilizes (instances of) some or all of these in providing for the implementation of the process execution engine 112. Moreover, although specific examples are provided herein in the context of the Java platform/language, it will be appreciated that other platforms also may be utilized, such as, for example, the NET platform from Microsoft. The application server 114, however, may not be considered sufficiently trustworthy to provide certain security mechanisms, such as authentication, for the process execution engine 112. For example, an attacker with malicious intent may gain access to the application server 114, and, without the security techniques described herein, may thereby gain access to data associated with the executing process model 102 (including, potentially, data stored in association with the business application 106).

In FIG. 1, an operational component 116 refers to virtually any software component that may execute within the process execution engine 112. For example, as referenced above, the process execution engine 112 may include components that are generally generic to some or all process execution(s) (e.g., scheduling or messaging components), and such components are represented in FIG. 1 by an execution component 118. Additionally, there may be components that are specific to the business application 106 (e.g., a component used by a bank to determine a credit score as part of a loan process of the business application 106), and that may therefore vary between implementations of the process execution engine 112. Such components are represented in FIG. 1 by an application component 120. Further examples of the execution component 118 and the application component 120 are provided in more detail, below, e.g., with respect to FIG. 2 and FIG. 5.

In FIG. 1, as referenced above, the system 100 provides high-level security, e.g., at an application layer, for the instance of the process model 102 executing within the process execution engine 112 of the execution environment 104. More particularly, for example, in a Java/J2ee environment, the process execution engine 112, and other components of FIG. 1, may be implemented using the Java package concept. Thus, the system 100 provides for a variety of combinations and sequences of a plurality of security services 126 that are provided, and that execute, within the execution environment 104, e.g., that may execute as sub-packages of the package(s) that implement the process execution engine 112. As described in detail below, the security services 126 may include a plurality of different security services, relating, for example, to confidentiality and integrity of data, authentication and authorization of users or of code, and other mechanisms for providing desired level and type of security.

In providing a desired selection, sequence, or subset of the available security services 126, a security provider 121 may be included that serves as a gateway or join point between all of the security services 126 and the operational component 118. For example, as the operational component 118 seeks to perform an operation that requires a certain sequence or combination of security services, the security provider 121 may serve to determine the required ones of the security services 126, and to provide the required security services by, for example, instantiating appropriate objects therefore, or by providing a reference or pointer to the appropriate service. It will be appreciated that although the security provider 121 is illustrated in FIG. 1, there may be multiple security providers, or multiple instances of the security provider 121, where each security provider (instance) may be associated with different ones or groups of the security services 126 (e.g., a first security provider associated with authentication, and a second security provider associated with authorization).

As a specific example, in Java, the security provider 121 may be written as a factory class that is used to create instances of other related classes in a compatible manner. Such a factory class may be defined using appropriate interfaces, so that the knowledge required by the operational component 116 to access the security services 126 may be limited and discrete. Further examples of the structure and operation of the security provider 121 are provided in more detail below.

Thus, during execution of the process model 102 within the process execution engine 112, the operational component 116 may seek to perform an operation. For example, if the operational component 116 represents a messaging component, then the operation may include sending a message. In so doing, the operational component 116 may consult an appropriate security policy (which may be stored, as described in more detail below, in a policy files database 138 of a repository 136), and may then propose to formulate the message with the appropriate security mechanisms.

The operation of the operational component 116 may then be determined or detected by a policy enforcement point (PEP) 122, or, more specifically, the PEP 122 may be used to determine current attributes of the operation of the operational component 116 (e.g., of either the execution component 118 or the application component 120), so that a policy decision point (PDP) 124 may then determine whether the operation of the operational component 116 is allowed, and/or whether and how security services 126 should be implemented in conjunction with the proposed operation(s). As illustrated in FIG. 1, and described in more detail below, a policy infrastructure 128 may be used to facilitate communications between the PEP 122, the PDP 124, and the security services 126. In some example implementations, the PEP 122, the PDP 124, and/or the policy infrastructure 128 may be implemented using an appropriate language, such as, for example, Java or .Net, while the associated policies may be written in, for example, the Extensible Access Control Markup Language, or XAMCL, for parsing by the PEP 122/PDP 124.

Once a decision has been made regarding whether and how the security services 126 may be provided in conjunction with the proposed operation, the operational component 116 may communicate with the security services 126 through the security provider 121, as described herein. When using the PEP 122, PDP 124, and the policy infrastructure 128, the security provider 121 may be implemented as illustrated by the security provider 121a, which illustrates that the PEP 122 may be configured to interact with the security provider 121a in providing the security services 126.

Because the security provider 121 (and 121a), PEP 122, PDP 124, policy infrastructure 126, and security services 126 are implemented within the process execution engine 112 itself, the system 100 may be used to provide very fine-grained, flexible, and dynamic control in providing the security services 126. For example, because the PEP 122 is executed within the process execution engine 112, and is directly associated with the particular operational component 116 (e.g., with one of the execution component 118 or the application component 120), the PEP 122 may include component-specific attributes 130 that are associated with, for example, the execution component 118.

For example, if the execution component 118 includes a messaging component, there may be a number of attributes that may be associated with a given operation of the messaging component, e.g., a source or destination of the message(s), or an authorization/authentication technique requested for the message(s). Thus, all of the possible or contemplated attributes of such a messaging component may be listed in the component-specific attributes 130, and attribute extraction logic 132 may determine which, of these possible attributes, is currently present, associated with, or relevant to, the particular operation of the messaging component (i.e., the execution component 118). Based on the determined/present attributes, a decision may be requested from the PDP 124 as to whether the messaging operation may continue, and, if so, which of the security services 126 may or should be provided in conjunction therewith.

Similarly, attributes of the application component 120 may be stored in the component-specific attributes 130. For example, where the business application 106 includes a banking application that requires a credit score of a loan applicant, there may be very specific security requirements associated with an operation of the application component 120 (for example, a specific type or level of authorization may be required to determine an applicant's credit score multiple times within a specified time frame, and a certain number of credit checks within the time frame may be prohibited altogether). By checking attributes of the specific request against the component-specific attributes 130, the PEP 122, may determine, for example, that a frequency of credit checks within the specified time period exceeds a maximum allowed number, and an associated authorization service of the security services 126 may be denied to the application component 120 by the PDP 124.

In providing the security services 126 in the manner described herein, the system 100 may make use of lower-level security services, illustrated in FIG. 1 as native security modules 134 provided by the application server 114. For example, as referenced above, and discussed in more detail below, the native security modules 134 may include, for example, the Java Cryptography Extension (JCE) that provides support, for example, for key-based encryption/decryption and message authentication programs. The native security modules 134 also may include, as another example, JAAS or other known techniques or data used in standard security techniques. Of course, such native security modules 134 may vary in type and number, e.g., based on the particular platform provided by the application server 114.

Further, the application server 114 may include the repository 136, which may be a secure repository. The repository 136 may be used, for example, to provide policy files 138 that are designed to be used by the operational component 116 to perform associated operations, and that are used by the PDP 124 to determine whether the operational component 116 did, in fact, follow the security policies within the policy files 138, and to thereby make its decision(s) regarding a specific request from the PEP 122. For example, although a security policy in the policy files 138 may specifiy a certain level or type of authentication to be used in an operation of the operational component 116, it may occur that the operational component 116 is compromised due to a security breach, and is seeking to perform a malicious operation within the execution environment 104. In this case, the PDP 124, by validating the proposed operation against the security policy in the policy files 138, may determine that a problem exists with the proposed operation, and may take appropriate action at that time.

Accordingly, the policy files 138 may specify such policy aspects as what type of authorization is required for a particular operation of the operational component 116, or, in the banking example above, may specify the number of times that a credit score may be checked before additional authorization is allowed, or before the request is refused altogether. Further, the secure repository 136 may include secure storage 140, which may represent virtually any technique used to maintain confidentiality and integrity of stored data, including, for example, digital signatures, encryption keys, or business-specific data that must be stored securely.

Thus, the system 100 may be used to leverage new or existing security techniques for use within a process execution engine in a manner that is specific to a particular process model (e.g., the process model 102), and/or to specific instances of such a process model, during the actual execution thereof. Consequently, for example, the process model 102 may be implemented multiple times within the process execution engine 112 at any given time, and different security mechanisms may be provided in each instance, depending, for example, on an identify of a user of a given instance, or on how the process develops within the particular instance. Thus, a very high level of security may be provided, when needed, in a consistent and widely-applicable manner, while still being fine-tuned to implementations of particular operational component(s) 116.

Figure 2:
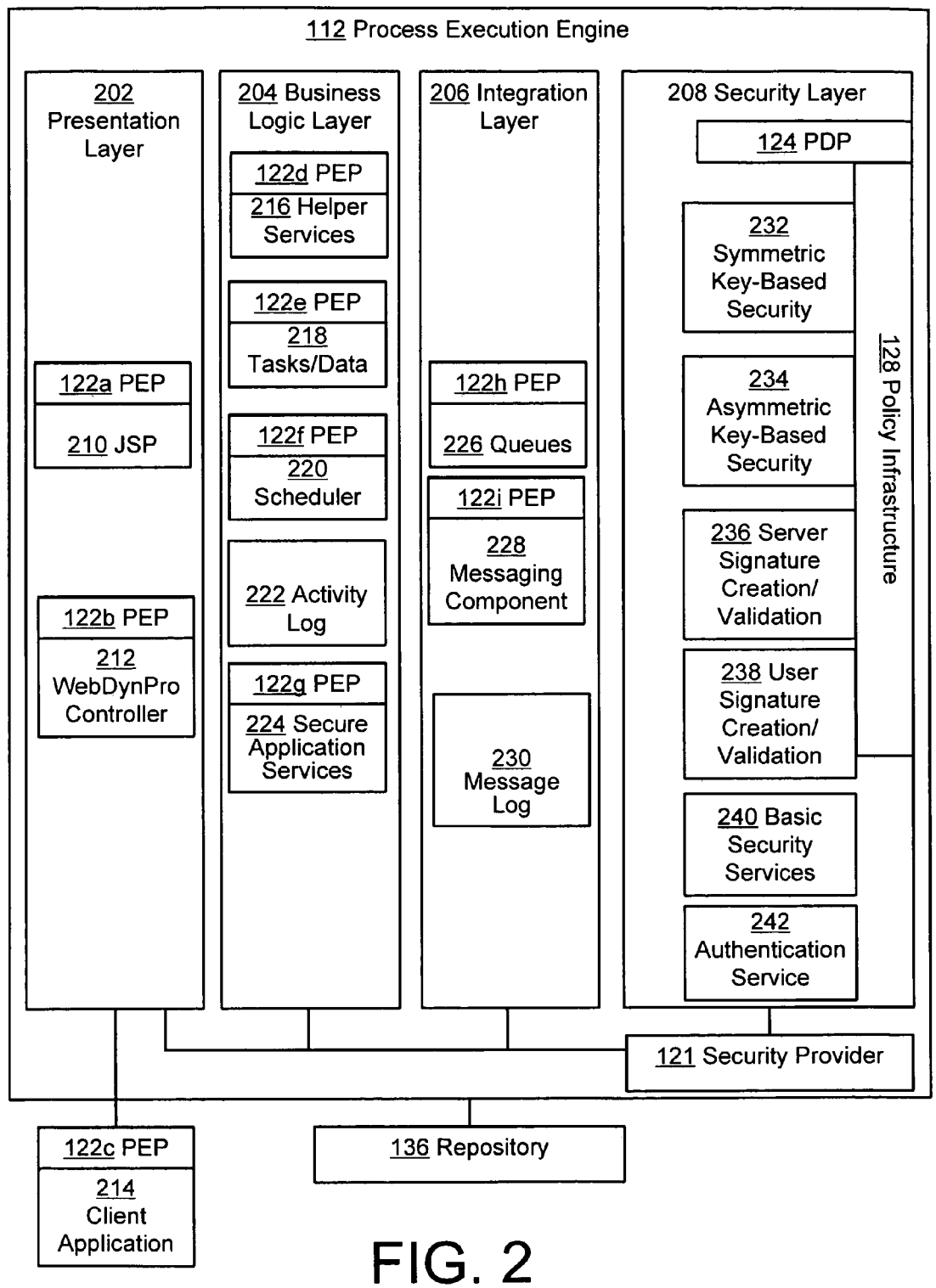
FIG. 2 is a block diagram of an example process execution engine of FIG. 1.

FIG. 2 is a block diagram of the process execution engine 112 of FIG. 1 in which examples of the operational component(s) 116 are illustrated in more detail. For example, and by way of overview, the execution environment 104 of FIG. 2 includes a presentation layer 202, a business logic layer 204, an integration layer 206, and a security layer 208. As shown, and as described above, the security layer 208 is in communication with the layers 202-206 by way of the security provider 121.

The presentation layer 202 generally refers to server-side modules used to render or otherwise provide a graphical user interface (GUI). For example, the presentation layer 202 may include Java Server Pages (JSPs) 210 or WebDynPro controller 212 from SAP, both of which generally represent examples of how content may be generated for display on a client application 214. For example, the JSPs 210 may be used to dynamically generate Hyper-text Markup Language (HTML) or eXtensible Markup Language (XML) documents that may be displayed on the client application 214, e.g., a web browser or components thereof (e.g., Java Applets).

The business logic layer 204 generally represents components associated with executing control of the (instance of the) process model 102, based on how the process model 102 is specified (e.g., in BPEL) and/or based on specific requirements of the associated application(s), e.g., the business application 106. For example, the business logic layer 204 may include helper services 216 that may be used for a number of purposes, including, for example, locating services 110 to be invoked. Tasks/Data 218 refer(s) generally to instances of objects that are part of the specification of the process model 102, that may be written, for example, in BPEL or other appropriate language. A scheduler 220 may be used to maintain the timing of a control flow for one or more instances of the process model 102. An activity log 222 may be used to record executed ones of the tasks (e.g., using a timestamp, actor, and/or action/description). Finally in the business logic layer 204, secure application services 224 may represent domain-dependent application services to be run locally within the execution environment 104 (and within the process execution engine 112), and, as such, may represent examples of the application component 120 of FIG. 1.

In the integration layer 206, communication issues may be handled that may be internal to the execution environment 104, or that may be responsible for external communications, as well. For example, queues 226 may be used to persist, temporarily, received and sent messages in a desired order (e.g., order of receipt). The queues 226 may store messages from or to messaging components 228, which may themselves be used to parse, assemble, and/or exchange messages. Once sent or received, a message log 230 may be used to record relevant or desired aspects of each record.

The security layer 208 generally encompasses and represents the security services 126 of FIG. 1. As referenced above, the term security may encompass, include, or be associated with a number of related concepts. For example, security in these contexts may include authentication, including determining identity information for a user and/or source information for data or code. Thus, the (human) task performers 108 may need to be authenticated to the process execution engine 112, and, at the same time, the process execution engine 112 may need to be authenticated to the task performers 108. Further, modular code or code updates running in the execution environment 104 and/or the process execution engine 112 may need to be authenticated with respect to their origin or source.

Security also may include confidentiality and integrity of data, e.g., of data to be persisted and of data to be communicated/exchanged using various communication channels. Authorization may be provided so that access to resources may only be granted for authorized or permitted identities/users. Also, the process execution engine 112 may be provided with security measures to ensure its own availability, e.g., in the face of denial of service attacks.

A final example of a security measure to be provided by the security layer 208 (representing an example implementation of the security services 126) includes accountability or non-repudiation. This security concept refers to situations, for example, in which strong audit requirements are in place. For example, an approval process, such as for approving a loan, may involve a heavy need to establish and document certain aspects of the process(es), such as performing a credit check or inspecting available assets. Within the process execution engine 112, establishing and maintaining log entries, such as in the activity log 222, may analogously need to meet certain audit requirements, e.g., associated with the particular business application 106. Audit requirements also may be associated at a code level for code in the execution environment 104, such as when code updates are required to establish proof of their origin that must be established, documented, and maintained.

In FIG. 2, then, security services 232-242 represent various examples of services that may be used in various combinations and various orders to provide the above (and other) security requirements, for example, for the layers 202-206, as described in more detail, below. In generally, it will be appreciated from the above description of FIG. 1 that certain components of the layers 202-206 represent execution component(s) 118 of FIG. 1 (e.g., components of the baseline workflow management coalition architecture), such as the JSP 210, the WebDynPro controller 212, the helper services 216, the tasks/data instance(s) 218, the scheduler 220, the queues 226, and the messaging component 228. Meanwhile, the application component 120 of FIG. 1 may be represented by the example of secure application services 224, which may be associated with the business application 106.

As shown, and as will be appreciated from FIG. 1, many of the operational components 210-230 may include an associated policy enforcement point (PEP) 122*a*-122*i*. As described above, each PEP 122*a*-122*i* may be configured to analyze an operation of its associated component, and determine associated attributes of the component and/or the operation that are present and that are security-related. Then, the PEP(s) 122*a*-122*i* may present these attributes to the policy decision point (PDP) 124 (using the policy infrastructure 128), which may then compare the attributes to the security policy files 138 (not shown in FIG. 2) within the repository 136 and determine whether the operation will be permitted to proceed. Specific examples of these techniques and procedures are described in more detail, below, but it will be appreciated from the above and from the discussion of FIG. 1 that these techniques may be used to provide a security-hardened version of the execution environment 104, and to ensure that the process execution engine 112 may be viewed as an explicitly trusted subsystem. For example, even communications between the PEP 122, PDP 124, and the policy infrastructure 128 may be secured, since those components also have direct or indirect access to the security services 232-242.

In FIG. 2, the security layer 208 may be implemented as a class that is designed to group the security services 232-242 for coordinated provision thereof to desired ones of the components 210-230, by way of the security provider 121. Specifically, as shown, the security layer 208 may include a symmetric key-based security service 232, e.g., for using symmetric encryption/decryption to maintain confidentiality in messages/data, as well as in maintaining confidentiality in session management. Somewhat similarly, the security layer 208 may include an asymmetric key-based security service 234, e.g., for using asymmetric encryption/decryption to maintain confidentiality in messages/data, as well as in maintaining confidentiality in interactions between the user(s) and the process execution engine 112.

The server signature creation/validation service 236 may provide authentication, integrity, or non-repudiation by allowing the process execution engine 112 to sign and validate its interactions, while the user signature creation/validation service 238 may provide authentication, integrity, or non-repudiation by allowing human user to sign and validate their interactions with the execution environment 104.

Basic security services 240 may be used in whole or in part to meet virtually any of the security requirements referenced herein, or others, by providing known security functions including providing hashing data or other hash-related security techniques, or by providing a secure storage environment for the encryption/decryption keys. The authentication service 242 may be related to providing authentication for a user session with the process execution engine 112. Of course, the security services 232-242 are merely non-limiting examples, and additional or alternative security services may be used, as well.

Further, there may be a number of other standard components, services, or features that may be used that may be associated with the execution environment 104 and/or the application server 114. For example, such components may include a secure storage environment, perhaps associated with the repository 136, such as Java Cryptographic Architecture (JCA) keystores. Also, the process execution engine 112, task performers 108, and/or the application server 114 may have (or may have access to) all necessary credentials, certificates, signatures, keys or other security components that may be required or used by the security services 232-242.

The following describes a number of examples of how the systems of FIGS. 1 and 2 may be used to provide security mechanisms for authentication, confidentiality, integrity, and authorization. For example, mutual authentication may be provided by authenticating the task performers 108 on the one hand, while authenticating the process execution engine 112 itself on the other hand. In this regard, for example, the authentication service 242 may include, or may access, the Java Authentication and Authorization Service (JAAS) referenced above, such as, for example, in a situation involving the JSP 210 interacting with the client application 214 (e.g., a web browser). In this case, the authentication mechanisms may be based on appropriate client or server certificates, or may be username/password based for the task performer 108.

The authentication security policy may, in the JAAS example, be implemented as a JAAS configuration file. Further, such authentication may result in a confidential session between the task performer 108 and the process execution engine 112 (e.g., including establishing non-persisted session credentials and/or a symmetric key that are only used within the session). Thus, for example, user credentials, including signature credentials, may be stored in the repository 136 and retrieved from the authentication service 242 for use by the user signature creation/validation service 238, using conventional identity management protocols.

Further with regard to authentication, as referenced above, it may be necessary or helpful to authenticate (a source or origin of) code running in the execution environment 104. Such a requirement implies that only code from a trusted source should be executed in the execution environment 104, including code related to executing the process model 102 as well as code for extensions, updates, or upgrades to the process execution engine 112. For example, a security policy may be used that provides trusted sources and links to certificates of the trusted sources; such a security policy may be translated, in a Java-based example, to Java Virtual Machine (JVM) policies, so that the referenced certificates required to verify a signature stating the code's origin may be stored in a trusted keystore.

With regard to confidentiality, the security layer 208 allows confidential data to be protected when persisted, and provides for message/channel confidentiality (e.g., when invoking remote services). In the former case, for example, workflow relevant data (e.g., an invoice) may be encrypted and stored in the repository 136 using a persisted cryptographic key established by the security layer 208, e.g., the symmetric key-based security service 232, which may implement the Java Cryptographic Extension (JCE) referenced above.

In the latter case, the symmetric key-based security service 232 may bind the cryptographic key to a particular session (without being persisted), and may select an appropriate security standard (e.g., secure sockets layer (SSL) for browser/channel-based communications or web services (WS)-Security for message based communications between applications). For example, the messaging component 228 may be associated with a security policy that maps different sources/recipients or protocols to required security standards and/or cryptographic mechanisms. For example, the security policy may specify that for one or more sources, a corresponding recipient having a particular domain name or other identifier should use the hypertext transfer protocol (http) and SSL. Or, the security policy may specify that for certain sources and recipients, the Simple Object Access Protocol (SOAP) should be used with WS-Security. In some communications/messaging scenarios associated with the messaging component 228, certain standards may require the asymmetric key-based security 234, using, for example, the credentials of the process execution engine 112.

The secure application services 224 also may have confidentiality requirements. For example, the secure applications services 224 may be associated with a credit verification service. Then, confidentiality of associated data may be obtained by, for example, running the secure application services 224 within the security-hardened execution environment 104 (e.g., deploying them within the same container(s)). For example, the process execution engine 112 may verify the integrity of some or all of the components 210-230, e.g., at start-up, as performed by one of the helper services 216. For example, such a helper service may track integrity information (e.g., (keyed) hashes) for each component (e.g., for each component's Java byte code) for verification in order of component start-up. Further, confidential channels/relationships between pairs or sets of the components 210-230 may be defined, by, for example, establishing a confidential communications channel, or by eliminating remote access invocations of specific components within a designated namespace (e.g., specifying an action/method invocation within a component and within a specific domain name). For example, corresponding ones of the security services 126 (e.g., the symmetric key-based security service 232 and the basic security services 240) may be called to establish a SSL secured channel, establish a symmetric key, encrypt data symmetrically, and provide integrity using keyed hashes (e.g., a keyed-hash message authentication code, or "HMAC").

A number of the components 210-230 may require integrity of messages, as well as of logged or persisted data. For example, certain components of the components 210-230 may require hash functions provided by the basic security services 240. More specifically, for example, a confidential communication channel with an established session key may require a keyed hash message authentication code, e.g., HMAC) provided by the symmetric key-based security service 232 using the basic security services 240. As another example, auditability of logs or non-repudiation of human centric workflow items may require digital signatures provided by services 236 and/or 238. In the latter case(s), for example, it may occur that a server signature from the server signature creation/validation 236 is sufficient (e.g., for filling a log entry in the activity log 222 or the message log 230), while it also may occur that a workflow item (e.g., an invoice approval) may require human input by a task performer 108, using a signature credential from the user signature creation/validation service 238.

In either the automated or human example, the trigger for the required signature occurs internally to the process execution engine 112, either by the component writing the log entry or by the object instances requesting action by the human task performer 108. In the automated example, a security policy for the relevant component writing to the log(s) may specify that for a target of the activity log 222a signing/log entry activity may require HMAC and AES-128 (referring to the 128 bit version of the Advanced Encryption Standard), while a target of the message log 230 may require the a version of the secure hash algorithm (e.g., SHA1) security for any action.

Authorization may be addressed in multiple scenarios. For example, on a human user level (e.g., which user is authorized to access a particular workflow item), human users may be provided with authorization that is rooted in the authentication techniques described above (e.g., through the use of JAAS services), which may follow a role-based access control model, so that authorization may then be enforced at the level of the presentation layer 202 by allowing access only to authorized object instances corresponding to a task of the process model 102. In other implementations, an even finer granularity of control may be provided, e.g., by implementing a PEP within each separate object instance. On a component level (e.g., which component is authorized to communicate with specific other component(s)), each component may have knowledge of which process execution engine (e.g., the process execution engine 112) to which it belongs, and may verify the integrity of each component at a start-up of the process execution engine. Finally, at a human administrator level (e.g., how policies are deployed and maintained), authorization may be based on the authorization framework for EJBs, so that, for example, an EJB encapsulating all administrative logic may only be authorized for identities with an administrator role.

Figure 3:
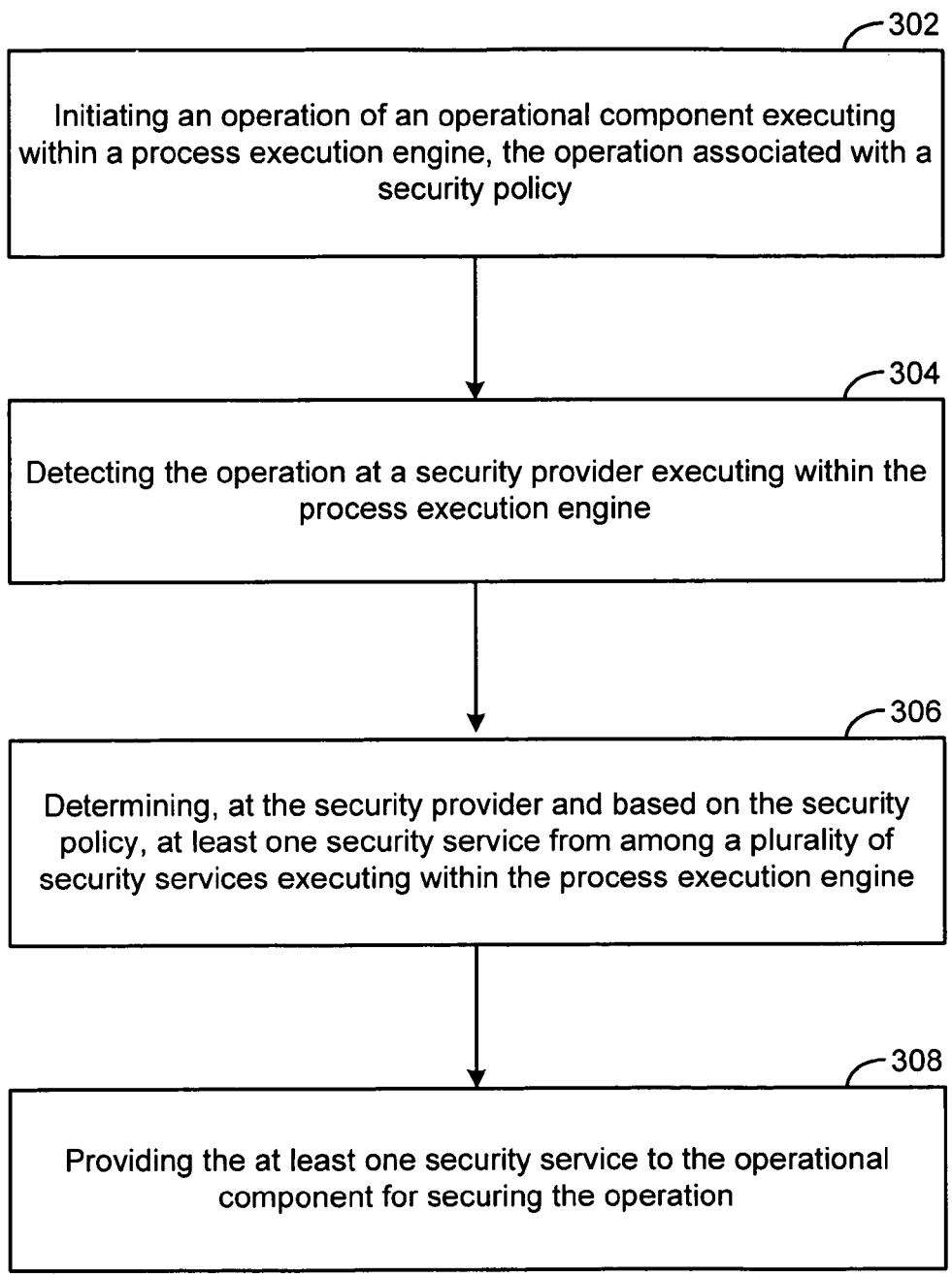
FIG. 3 is a first flowchart illustrating example operations of the systems of FIGS. 1 and 2.

FIG. 3 is a first flowchart 300 illustrating example operations of the systems of FIGS. 1 and 2. In the example of FIG. 3, an operation of an operational component executing within a process execution engine may be initiated, the operation associated with a security policy (302). For example, the operational component 116 (e.g., the execution component 118 or the application component 120) may initiate an operation based on a security policy stored in the policy files 138. For example, the messaging component 228 may initiate the operation of sending a message.

The operation may be detected at a security provider executing within the process execution engine (304). In one example implementation, the security provider 121 may detect the process based on a direct communication with the operational component 116. In another example implementation, as described in more detail herein, there may be a series of intermediate operations, such as the described interactions of the policy enforcement point 122, policy decision point 124, and the policy infrastructure 128. Then, as described in more detail, for example, with respect to FIG. 4, once the operations of these components are completed and it is decided that the operation may continue, the policy enforcement point 122 may be responsible for invoking and/or interacting with the security provider 121 (e.g., with the security provider illustrated as the security provider 121a in FIG. 1).

Then, at the security provider and based on the security policy, at least one security service may be determined from among a plurality, or set, of security services executing within the process execution engine (306). For example, the security provider 121 (or 121a) may determine which of the set of security services 126 (e.g., 232-242) may be required to secure the operation. The determination of the security provider 121 may be as simple as executing a command for specific security services received from the operational component 116 or the policy enforcement point 122, or the security provider 121 may have sufficient intelligence and access to determine which of the security services 232-240 are required.

At least one security service may be provided to the operational component for securing the operation (308). For example, the security provider 121 may provide objects or references to objects associated with appropriate ones of the set of security services 126. In so doing, the security provider 121 may provide the access to the desired/required security services in a particular order, sequence, or combination that may be required for a particular component, operation, and/or security policy.

Figure 4:
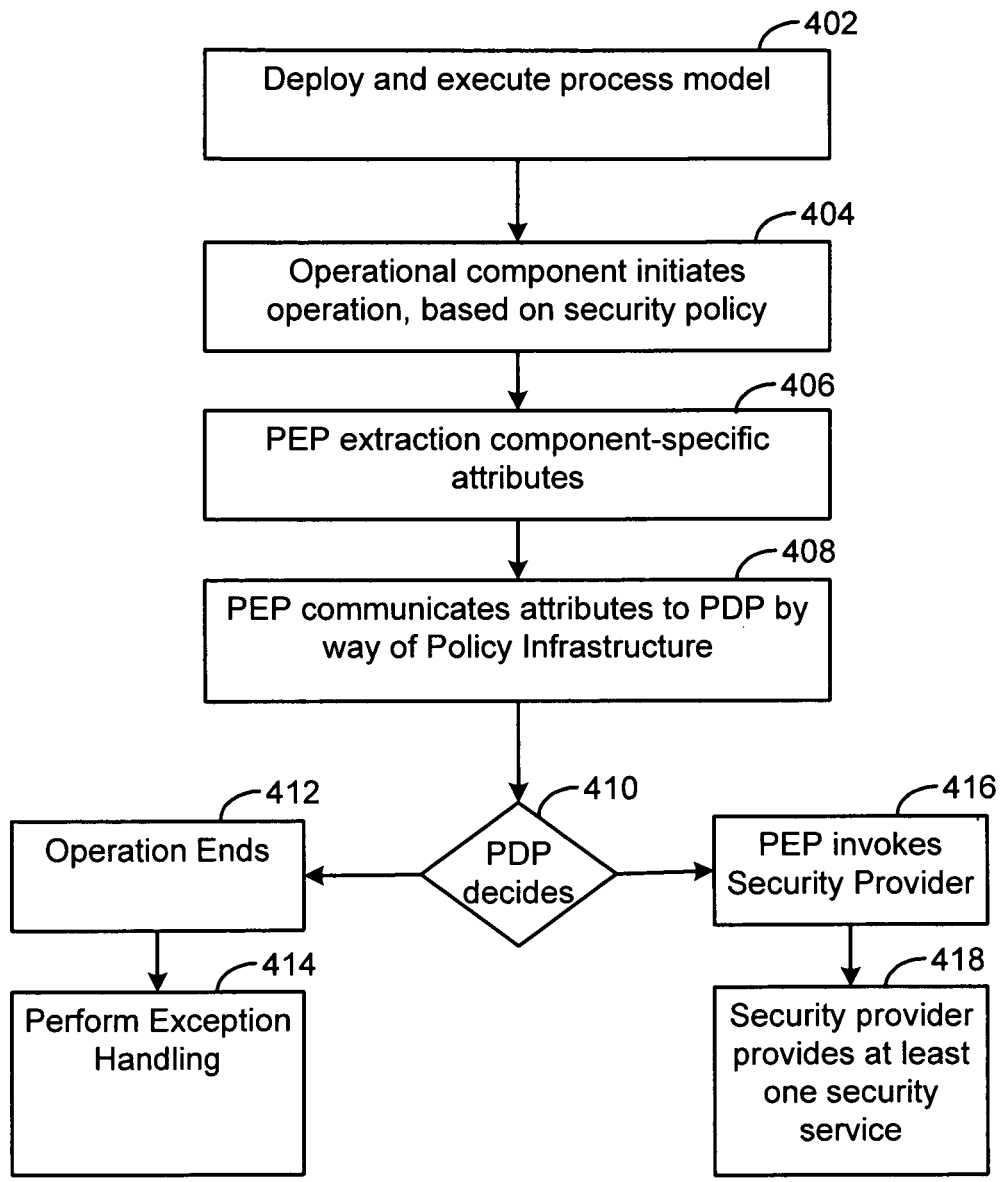
FIG. 4 is a second flowchart illustrating example operations of the systems of FIGS. 1 and 2.

FIG. 4 is a second flowchart 400 illustrating example operations of the systems of FIGS. 1 and 2. The example of FIG. 4 begins with the deployment and initial execution of a process model (402). For example, the process model 102 may be deployed into the process execution engine for execution.

During the execution, an operational component may initiate an operation, based on a security policy (404). For example, as just referenced, the messaging component 228 may initiate the sending of a message, and may consult with the appropriate security policy within the policy files 138 to determine what security should be applied to/for the operation. As should be appreciated, the security policy may specify a number, type, order, sequence, or combination of the security services 232-242 (or others).

A policy enforcement point may extract component-specific attributes from/for the operation (406). For example, the attribute extraction logic 132 of the PEP 122 of FIG. 1 may consult with a table of available attributes 130 that may be included in this operation, and may determine which of the possible attributes 130 are applicable to the present operation.

The policy enforcement point 122 may then communicate the subset of attributes to the policy decision point, by way of the policy infrastructure (408). Then, the policy decision point 124 may determine (410) whether it would be possible to validate the proposed operation and security measures against the allowed operations, based on the policy files 138.

If the policy decision point 124 decides that the proposed operation does not match the security requirements for the component in question (410), e.g., if the operational component 116 has had a security breach and therefore the operation does not accurately reflect the security policy from the policy files 138, then the operation of executing the process model may end (412). At this point, the operation may simply end, or exception handling may occur (414) that may allow, at this point, a re-execution of the operation with appropriate correction/revision. Otherwise (410), the policy enforcement point 122 may be asked to find and invoke the security provider 121 (416), and the operation may continue using at least one security service(s), or combinations thereof.

Figure 5:
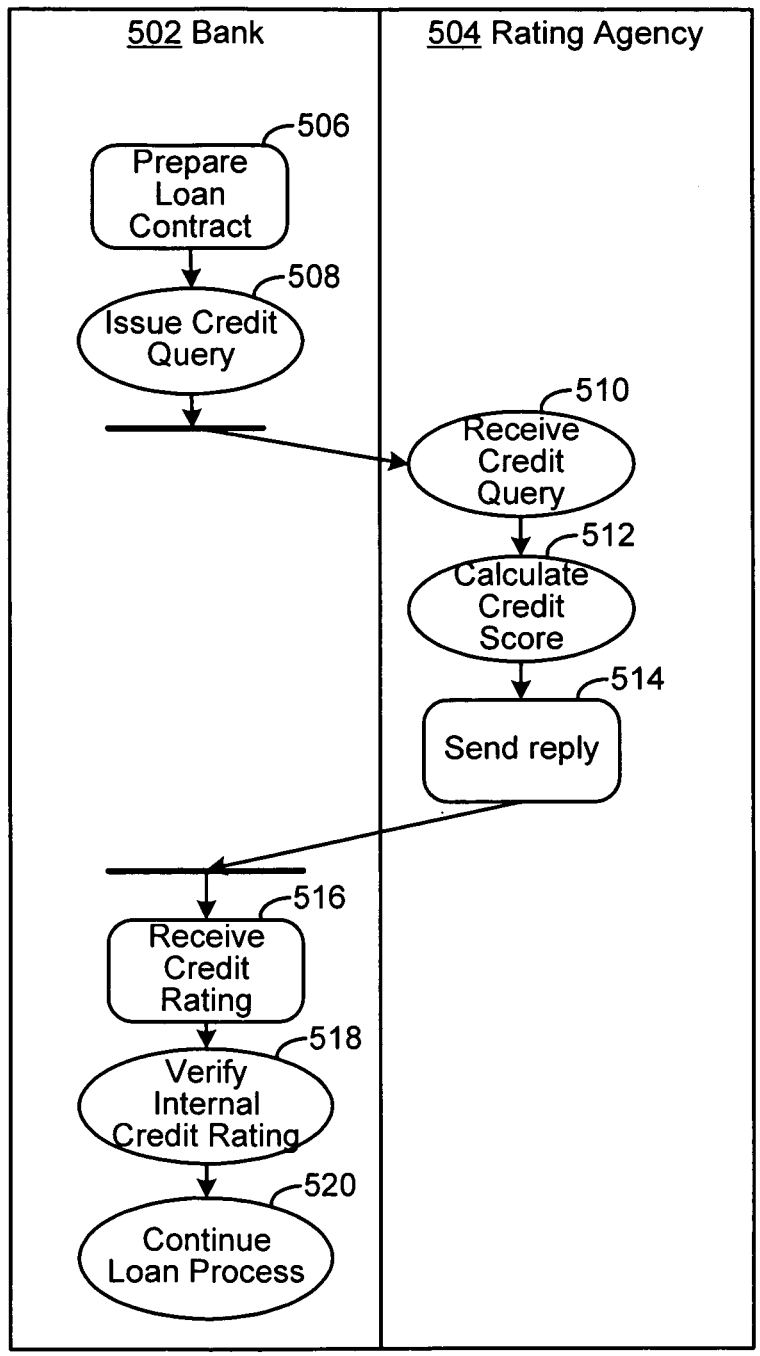
FIG. 5 is a block diagram of collaborating process models implemented using the systems of FIGS. 1 and 2.

FIG. 5 is a block diagram of collaborating process models implemented using the systems of FIGS. 1 and 2. In FIG. 5, the example includes a loan process in which a bank 502 interacts with a rating agency 504. The bank 502 may run the security-hardened process execution engine 112 referenced and described above, while the rating agency 504 may provide a credit rating service that may be invoked over the Internet as a web service. For the example of FIG. 5, it is assumed that the process execution engine 112 is running in the execution environment 104 that includes a J2EE web container and that the application server 114 is associated with server signature credentials in a cryptographically-protected keystore (e.g., the repository 136).

In the example, a bank clerk as the task performer 108 may be associated with a locally-stored private key and client certificate, and related signature credentials may be obtained after authentication and made available to the user signature creation/validation service 238.

Security polices may be stored in the repository 136, as shown by way of example in Tables 1-4:

TABLE 1

| Authentication Policy | | |
|---|---|---|
| User | Role | Authentication Module |
| Jack | Clerk | X.509 #client certificate based authentication |
| Business Process Engine 1 | Business Process Engine | X.509 #server certificate |
| William | Admin | X.509 #client certificate based authentication |

Thus, in Table 1, users having different roles may be specified as being authenticated in different, appropriate ways. For example, as shown, different types of certificate-based authentication may be specified.

TABLE 2

| Confidentiality | | | |
|---|---|---|---|
| Source | Recipient | Protocol | Security Standard |
| 10.* | DN = Jack | http | SSL #local |
| 10.* | 130.* | SOAP | WS-Security # remote |

For Table 2, various confidentiality parameters also may be associated or relevant, such as, for example, a specification of a cryptoprovider as the SunJCE, or a specification of a symmetrically enciphered communication occurring by way of AES/128/CBC (cipher block chaining). Then, as shown, sources and recipients may be associated with corresponding communications protocols, as well as with corresponding security standards.

TABLE 3

| Integrity | | |
|---|---|---|
| Target | Action | Mechanism |
| Com.bank.ejb.BPO.LoanContractIMPL 130.* | Sign Activity SOAP BODY | RSA/SHA1/1024 AES/SHA1/128 |

For integrity concerns, as shown in Table 3, targets may be specified by (application) specific EJB(s), or by domain/address. Appropriate security mechanisms may be specified as shown, and associated with specific actions.

TABLE 4

| Authorization | | | |
|---|---|---|---|
| Subject | Target | Action | Constraint |
| Role == Clerk | Com.bank.ejb.btm | CreateLoanContract | |
| Role == Admin | Com.bank.ejb.admin.* | * | |
| Com.bank.ejb.-btm | Com.bank.ejb.BPO.-LoanContractIMPL | * | |

In Table 4, for authorization, subject-target pairs may be specified and associated with specific or generic action(s), which may be associated with human users (e.g., clerks, administrators) as well as with code-based/application/machine subjects (e.g., the code LoanContractIMPL). Constraints may be placed based on the role(s) or on the actions being taken.

Thus, in FIG. 5, the collaborating processes begin when a bank clerk initiates a loan contract (506), e.g., by creating a task in/for the process execution engine 112 by preparing the loan contract. For example, the clerk may use a web browser of a local desktop to authenticate itself against the JSP service/application 210 acting as a frontend/GUI to the process execution engine 112, using a client certificate that is also on the local desktop.

The process execution engine 112 may then authenticate itself against the clerk's browser using an appropriate server certificate, thus establishing a confidential SSL connection between the two entities. Once the loan contract is successfully created and input as an object instance in the process execution engine 112, the clerk may provide a signature (using signature credentials from the user signature creation/validation service 238) as a proof of non-repudiation. Then, the instantiation of the object may be logged into the activity log 222.

The process execution engine 112 may then issue a message including a credit query (508) by invoking a credit score service of the rating agency 504 (where the credit score service may be located, for example, using the helper services 216). This message-based service invocation requires a confidential communication channel, integrity of data, and non-repudiation for the reply. These requirements may be determined, for example, by a pre-deployed policy (e.g., in the policy files 138). In other examples, a corresponding policy may be transferred with the message itself, using an appropriate binding (e.g., a signature binding the message body and the policy).

Consequently, and assuming that the bank 502 and the rating agency 504 share a trust relationship and trust each others' certificate authority, then the scheduler 220 may be used to schedule the messaging component 228 to invoke the credit score service using, WS-Security, for example, using the symmetric key-based security 232 and the server signature creation/validation service 236, with a session key and using digital signatures to provide integrity and non-repudiation on the server level. The rating agency 504 receives the credit query (510), calculates the credit score (512), and sends the reply message (514) with the credit score for the customer.

The process execution engine 112 receives the reply (516), verifies the rating agency's signature using the server signature creation/validation service 236, and decrypts the message using the symmetric key-based security service 232. Receipt of the message is logged into the message log 230. The bank 502 may then verify the credit rating by performing an internal credit rating (518) using an internal, trusted service to perform plausibility checks and thereby determine how the loan process will continue (520).

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A system including instructions recorded on a computer-readable medium and executable by at least one processor, the system comprising:
    an application server configured to provide an execution environment; and
    a process execution engine configured to execute a process model within the execution environment, the process execution engine including
        an operational component configured to perform an operation of the process model based on a security policy which describes an allowable number and order of security services of a plurality of security services executing within the process execution engine, and
        a security provider configured to determine, based on the operation and on the security policy, a parameterization of a selected number and order of the allowable number and order of security services, and configured to secure the operational component according to the parameterization.

2. The system of claim 1 wherein the process model is associated with an application and wherein the operational component includes an execution component that is associated with the process execution engine independently of the application.

3. The system of claim 2 wherein the operational component includes an application component associated with the application.

4. The system of claim 1 wherein the operational component is associated with a policy enforcement point that is configured to analyze the operation to extract security-related, component-specific attributes.

5. The system of claim 4 wherein the policy enforcement point is configured to provide the attributes to a policy decision point that is configured to validate the attributes against the security policy, to thereby determine the parameterization.

6. The system of claim 5 wherein the policy enforcement point is configured to invoke the security provider in response to an affirmative validation decision received from the policy decision point.

7. The system of claim 5 wherein the policy enforcement point, the policy decision point, and the security services are in communication with one another by way of a policy infrastructure.

8. The system of claim 1 wherein the operational component includes one or more of a messaging component, a queue, a task scheduler, a task object, or a presentation component.

9. The system of claim 1 wherein the plurality of security services includes one or more of a key-based cryptography service, a signature creation/validation service, and an authentication service.

\* \* \* \* \*